Figure 1:
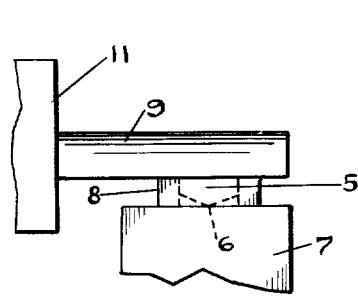

Aug. 3, 1954  H. A. HADLEY  2,685,482

PIVOT AND BEARING ASSEMBLY

Filed Jan. 7, 1952

INVENTOR
HARLAN A. HADLEY.
BY
*Henry Sherman*
ATTORNEY

Patented Aug. 3, 1954

2,685,482

UNITED STATES PATENT OFFICE 2,685,482

PIVOT AND BEARING ASSEMBLY

Harlan A. Hadley, Burlington, Vt., assignor to H. A. Hadley Associates, Inc., Burlington, Vt., a corporation of Vermont Application January 7, 1952, Serial No. 265,230

13 Claims. (Cl. 308—2)

This invention relates to weighing scales, and relates more particularly to a knife edge pivot and bearing assembly adapted for use in weighing scales.

In many weighing mechanisms, levers are supported and the forces are transmitted to and from the levers by means of knife edge pivot and bearing assemblies in which the knife edge pivot rests in a suitably mounted bearing provided with a V-groove. The V-groove normally positions the pivot in a longitudinal plane and anti-friction plates applied to the end of the bearing block normally restrains the pivot from endwise motion. As is well known, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife edge pivot, the knife edge pivot "skates" over the surface of the flattened bottom of the V-groove causing the lever to assume readily a different position for every different position of the knife edge pivot on the radius portion of the V-groove. The movement of the pivot relative to the radius portion of the V-groove alters the pivot distances, resulting in inaccuracies in the weighing.

It is an important object of this invention to provide an improved knife edge pivot and bearing assembly which will be free from the above-mentioned and other disadvantages and which will be especially simple in construction and efficient in use.

A further object of this invention is the provision in a weighing scale of a self-aligning bearing structure for supporting on its surface a knife edge pivot.

Another object of this invention is the provision of a knife edge pivot and bearing assembly wherein a flat bearing surface is restrained against movement in a horizontal plane but is free to rack in a vertical plane.

Still another object of this invention is to provide means for permitting the free turning on a flat-bearing surface of a knife edge pivot on its normal axis, while restraining said knife edge pivot from "skating" movement relative to said flat bearing surface.

Other objects of this invention, together with certain details of construction and combinations of parts, will be apparent from the following description and will be pointed out in the appended claims.

In accordance with my invention, I employ as a bearing a block of any suitable material of sufficient hardness such as, for example, a block of steel or a block or Norbide, a compound of boron and carbon. One surface of the bearing block is ground to optical flatness, while the opposite surface is ground to form an edge upon which it rests when in operative position. The bearing block is preferably rectangular in shape, although it may have any other geometrical contour. The perimeter of the bearing block is surrounded by a flame of an elastomer, such as natural or synthetic rubber, of a thickness equal to or slightly in excess of the bearing block at the point of its greatest thickness, i. e. through its fulcrum edge. The rubber frame is cemented or bonded onto a suitable supporting member, such as a fulcrum stand and this maintains the bearing block in predetermined position thereon. The knife edge pivot rests on the bearing surface of the bearing block in a position whereby its longitudinal axis is at right angles to the axis of the fulcrum edge of the bearing block. The knife edge pivot is prevented from "skating" movement over the surface of the bearing due to the friction between the knife edge of the pivot and the elastomer of the frame. Where the frame is of the greater thickness referred to above, the knife edge imbeds itself into the frame without affecting its freedom of angular movement. Since the bearing block rests on its fulcrum edge, the flat surface thereof will follow the position of, i. e. align itself with, the knife edge of the pivot, thus compensating for any irregularity in the position of said pivot.

Figure 2:
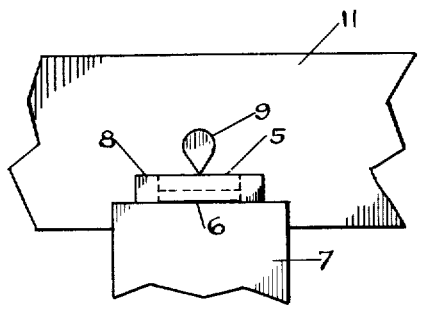
Figure 3:
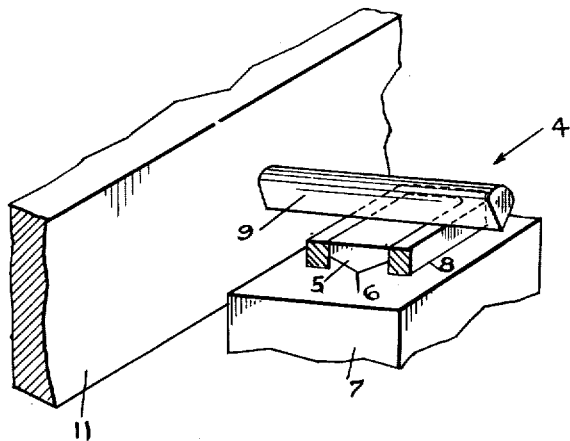

In order to describe my invention in greater detail reference is made to the accompanying drawing wherein a preferred embodiment of the invention is shown and wherein Fig. 1 is a side elevational view of my novel knife edge pivot and bearing assembly, Fig. 2 is an end elevational view thereof, and Fig. 3 is a perspective view thereof, with part of the bearing block frame partially cut away to show clearly the end structure of said bearing block.

Like reference numerals indicate like parts throughout the several views of the drawing.

In the drawings, wherein only such parts of a weighing scale structure as are necessary to describe my invention are shown, the reference numeral 4 indicates generally the knife edge pivot and bearing assembly of my invention. The assembly comprises a bearing block of relatively hard material maintained in predetermined position and a knife edge pivot operatively supported thereby. The bearing block 5 is substantially rectangular in shape and its upper or bearing surface is ground or polished to optical flatness. The under surface of said bearing block is ground to or formed with an edge 6 along its major axis. As will hereinafter be more apparent, the bearing block is fulcrumed on this edge 6. The bearing block may be supported in any suitable manner as, for example, on a fulcrum stand 7.

To hold said bearing block 5 in predetermined manner and position on said fulcrum stand 7, I have provided a frame 8 therefor, a frame closely fitting said bearing block and made of any suitable resilient material, preferably of an elastomer such as natural or synthetic rubber. The resilient frame is cemented, bonded or otherwise substantially fixed to the top of the fulcrum stand 7, and may, if desired, be cemented or bonded to the sides of the bearing block 5.

The knife edge pivot 9 shown fixed to a lever 11 of a weighing scale is so supported on the bearing block that the knife edge thereof is normal to the fulcrum edge 6 of the bearing block. Accordingly, when the pivot 9 is placed in position on the flat surface of the bearing block 5, the bearing block is capable of rocking, on its fulcrum edge 6, to align the flat surface thereof with the knife edge of the pivot; the frame, being of resilient material, permitting this rocking movement.

It is to be understood that the knife edge pivot and bearing assembly above described is capable of use and may be employed wherever knife edge pivots and bearings of this type are normally employed in weighing scales.

The embodiment of my invention shown and described herein is to be considered merely as illustrative, as my invention is susceptible to variation, modification and change within the spirit and scope of the appended claims.

What I claim as new and desire to secure by Letters Patent is:

1. In a pivot and bearing assembly for weighing scales, a bearing block for supporting a pivot, and means for holding said bearing block in operative position on a weighing scale element, said means comprising a frame of resilient material surrounding the perimeter of said bearing block, said frame being fixed to said weighing scale element.

2. In a pivot and bearing assembly for weighing scales, a bearing block for supporting a pivot, and means for holding said bearing block in operative position on a weighing scale element, said means comprising a frame of elastomer material surrounding the perimeter of said bearing block, said frame being fixed to said weighing scale element.

3. In a pivot and bearing assembly for weighing scales, a bearing block for supporting a pivot, and means for holding said bearing block in operative position on a weighing scale element, said means comprising a frame of rubber surrounding the perimeter of said bearing block, said frame being fixed to said weighing scale element.

4. In a pivot and bearing assembly for weighing scales, a bearing block having a flat surface for supporting a pivot and having a fulcrum edge on the surface opposite to said flat surface, and means for holding said fulcrum edge of said bearing block in operative position on a weighing scale element whereby said bearing block is rockably supported on said weighing scale element, said means comprising a resilient material applied to said bearing block and to said weighing scale element.

5. In a pivot and bearing assembly for weighing scales, a bearing block having a flat surface for supporting a pivot having a fulcrum edge on the surface opposite to said flat surface, and means for holding said fulcrum edge of said bearing block in operative position on a weighing scale element whereby said bearing block is rockably supported on said weighing scale element, said means comprising an elastomer material applied to said bearing block and to said weighing scale element.

6. In a pivot and bearing assembly for weighing scales, a bearing block having a flat surface for supporting a pivot and having a fulcrum edge on the surface opposite to said flat surface, and means for holding said bearing block in opposite position on a weighing scale element, said means comprising a frame of resilient material surrounding the perimeter of said bearing block, said frame being fixed to said weighing scale element.

7. In a pivot and bearing assembly for weighing scales, a bearing block having a flat surface for supporting a pivot and having a fulcrum edge on the surface opposite to said flat surface, and means for holding said bearing block in operative position on a weighing scale element, said means comprising a frame of elastomer material surrounding the perimeter of said bearing block, said frame being fixed to said weighing scale element.

8. In a pivot and bearing assembly for weighing scales, a bearing block having a flat surface for supporting a pivot and having a fulcrum edge on the surface opposite to said flat surface, and means for holding said bearing block in operative position on a weighing scale element, said means comprising a frame of rubber surrounding the perimeter of said bearing block, said frame being fixed to said weighing scale element.

9. A pivot and bearing assembly comprising a bearing block having a flat surface and a fulcrum edge on the surface opposite to said flat surface, means for holding said bearing block in position on a weighing scale element, said means comprising resilient material applied to said bearing block and said weighing scale element, and a knife edge pivot supported on said flat surface of said bearing block in such relation to said bearing block that the knife edge of said pivot is at right angles to said fulcrum edge of said bearing block.

10. A pivot and bearing assembly comprising a bearing block having a flat surface and a fulcrum edge on the surface opposite to said flat surface, means for holding said bearing block in position on a weighing scale element, said means comprising an elastomer material applied to said bearing block and said weighing scale element, and a knife edge pivot supported on said flat surface of said bearing block in such relation to said bearing block that the knife edge of said pivot is at right angles to said fulcrum edge of said bearing block.

11. A pivot and bearing assembly comprising a bearing block having a flat surface and a fulcrum edge on the surface opposite to said flat surface, means for holding said bearing block in position on a weighing scale element, said means comprising a frame of resilient material surrounding the perimeter of said bearing block and bonded to said weighing scale element, and a knife edge pivot supported on said flat surface of said bearing block in such relation to said bearing block that the knife edge of said pivot is at right angles to said fulcrum edge of said bearing block.

12. A pivot and bearing assembly comprising a bearing block having a flat surface and a fulcrum edge on the surface opposite to said flat surface, means for holding said bearing block in position on a weighing scale element, said means comprising a frame of rubber surrounding the perimeter of said bearing block and bonded to said weighing scale element, and a knife edge pivot supported on said flat surface of said bearing block in such relation to said bearing block that the knife edge of said pivot is at right angles to said fulcrum edge of said bearing block.

13. A pivot and bearing assembly comprising a bearing block having a flat surface and a fulcrum edge on the surface opposite to said flat surface, means for holding said bearing block in position on a weighing scale element, said means comprising a frame of an elastomer material surrounding the perimeter of said bearing block and bonded to said weighing scale element, and a knife edge pivot supported on said flat surface of said bearing block in such relation to said bearing block that the knife edge of said pivot is at right angles to said fulcrum edge of said bearing block.

References Cited in the file of this patent

UNITED STATES PATENTS

| Number | Name | Date |
| --- | --- | --- |
| 146,702 | Osgood | Jan. 20, 1874 |
| 2,223,872 | McWhorter et al. | Dec. 3, 1940 |
| 2,340,503 | Barenyi | Feb. 1, 1944 |

FOREIGN PATENTS

| Number | Country | Date |
| --- | --- | --- |
| 15,884 | France | June 9, 1856 |

Disclaimer and Dedication

2,685,482.—*Harlan A. Hadley*, Burlington, Vt. PIVOT AND BEARING ASSEMBLY. Patent dated Aug. 3, 1954. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]